Jan. 1, 1935.  F. T. IRGENS  1,986,150
BEARING
Filed May 20, 1931
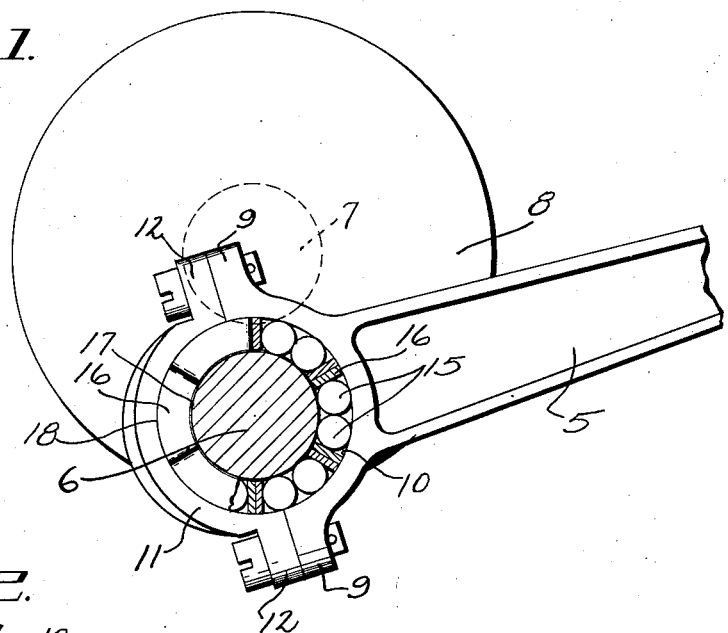
FIG. 1.
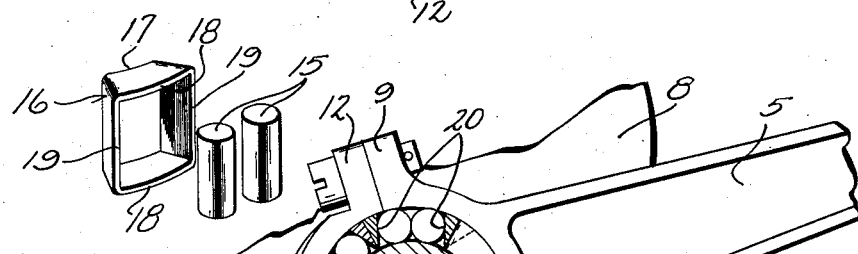
FIG. 2.
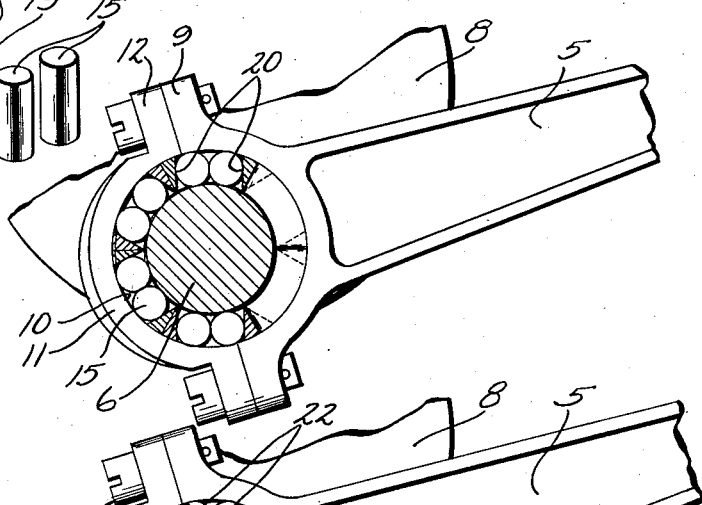
FIG. 3.
FIG. 4.
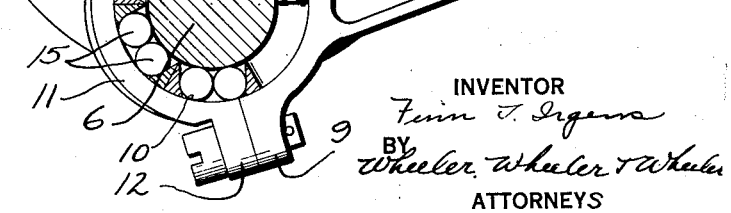
INVENTOR
Finn T. Irgens
BY
Wheeler, Wheeler & Wheeler
ATTORNEYS Patented Jan. 1, 1935

1,986,150

UNITED STATES PATENT OFFICE 1,986,150

BEARING

Finn T. Irgens, Wauwatosa, Wis., assignor to Outboard Motors Corporation, Milwaukee, Wis., a corporation of Wisconsin Application May 20, 1931, Serial No. 538,727

9 Claims. (Cl. 308—207)

This invention relates to improvements in bearings.

It is the primary object of the invention to provide a novel and improved bearing construction capable of standing up under heavy duty and at tremendously high speeds. The invention has particular application to bearings in which a continuous annular cage cannot be employed.

It has always been considered desirable in the design of anti-friction bearings to employ, wherever possible, a single annular cage, and in designing anti-friction connecting rod bearings for use on one-piece crank shafts where a unitary cage construction is impossible, it has been customary to provide for the fracture of an annular cage in order that the two parts might be fitted together to provide as nearly as possible the supposed equivalent for the desired unitary construction. In fact, this practice is very satisfactory under ordinary circumstances, but where the rotative speed of the crank shaft exceeds a certain value, it is found that no anti-friction bearing having a two-part cage can be used. The fact that the plane upon which the two parts of the cage are united happens to coincide with the diameter of the bearing space, makes it impossible to distribute accurately the forces to which each individual cage element is subject. Apparently the centrifugal forces acting on the cage elements and anti-friction members during the high speed rotation of the crank shaft are more destructive to such a connecting rod bearing than any forces to which the connecting rod itself is subject. So far as the rod is concerned, its pressures are distributed between the anti-friction members, but the centrifugal forces acting on the cage elements in continuously varying directions, cause rapid disintegration of the parts.

The present invention solves the problems presented by the above described situation through the use of a bearing in which the cage is subdivided to comprise a number of independent cage elements, the centrifugal pressure of each of which is transmitted directly to the connecting rod bearing. Although this is directly contrary to established practice, I have found that the use of bearing cage elements in any number in excess of two will meet the requirements of high speed crank shaft operation under load without breakage over long periods of time.

While any number of bearing elements in excess of two will permit that radial movement essential to the distribution of load without breakage, I prefer to use six or more of the cage elements in the ordinary crank shaft bearing of an internal combustion engine. It is important to note moreover that preferably each of the bearing elements contacts throughout its periphery with the outer bearing member to transmit directly thereto the distributed pressures developed in the cage element by centrifugal force.

In the drawing:

Figure 1 is an end elevation of a bearing embodying the invention, portions of the individual cage elements being broken away to expose the anti-friction members.

Figure 2 is a detail view in perspective of a single cage element and the two anti-friction members adapted to be received therein.

Figure 3 is a view similar to Figure 1, showing a somewhat modified cage construction.

Figure 4 is another view similar to Figure 1 showing a further slightly modified cage construction.

Like parts are identified by the same reference characters throughout the several views.

By way of illustrating the invention, I have shown a bearing between a connecting rod 5 and the crank 6 of a crank shaft 7, of which 8 is the crank cheek. The lower end of the connecting rod 5 has the usual ears 9 between which is a bearing surface 10 continued about the bearing cap 11, whose complementary ears 12 are connected with ears 9 in the usual manner.

Between the crank 6 and the bearing surface 10 is an anti-friction bearing embodying this invention. It includes anti-friction rollers 15, of which one or more may be assembled in an individual cage element such as may conveniently be stamped, as shown at 16 in Figures 1 and 2. The inner and outer margins 17 and 18 at the ends of the cage element, particularly the outer surfaces 18, are arcuately surfaced in accurate conformity to the adjacent bearing surface. Not only are surfaces 18 accurately fitted to bearing surface 10, but the outer margins 19 of the sides of the cage are also fitted to said surface. The ends of each cage are preferably planiform where rollers are to be engaged thereby, and the sides of each cage are externally radial in order that adjacent cages may fit together, as shown in Figures 1, 3, and 4.

The internal surfaces of the sides of the cages may be made as desired. Figure 3 shows the inner surfaces 20 to be substantially parallel to each other, while Figure 4 shows a special form of cage 21 in which the inner side surfaces 22 are outwardly convergent about the cylindrical sides of the rollers 15, to which the cages conform.

The number of anti-friction members received in a given cage element will obviously depend upon the size and particular design of the bearing and is unimportant from the standpoint of the present invention. If the number of cage elements is relatively small, the number of bearing members contained therein will ordinarily be correspondingly increased for a given size of bearing. As above noted, however, the number of cage elements should under no circumstances be as small as two, since it is found that a cage element occupying the full diameter of the bearing space will tend to disintegrate at high speeds, while any larger number of bearing elements will function satisfactorily. It is desirable that the number of bearing elements should be even rather than odd to facilitate assembly.

In a device embodying the present invention, it will be noted that all of the clearance between the cage elements and the shaft member 6 is at the inside of the cage elements, each cage element being in full contact about its outer periphery with the outer bearing member. The designs shown in Figures 3 and 4 provide additional bearing surface between the cage elements and the outer bearing member, and are thus adapted to withstand even higher speeds than the construction shown in Figures 1 and 2.

It is further to be observed that because each of the bearing cage elements is a closed figure its area of contact surface is increased, and it is the better adapted also to be fitted with other cage elements in an annular series, wherein the anti-friction bearing members themselves are wholly relieved of all strains from forces originating in the cage elements.

I claim:

1. In an anti-friction bearing, the combination with inner and outer bearing surfaces, of anti-friction bearing members interposed between said surfaces, and individual cage elements to a number in excess of two confining said members and peripherally contacting with the outer bearing surface substantially throughout the peripheral extent of said cage elements to receive support from said outer bearing surface, the sides of said cage elements being in mutual abutment along substantially radial lines.

2. In an anti-friction bearing, the combination with inner and outer bearing surfaces, of anti-friction rollers fitted between said surfaces and cage elements to a number in excess of two arranged in annular series between said surfaces, each such cage element comprising a closed figure having substantially planiform ends abutting the ends of the respective rollers, substantial radial sides contacting with the sides of adjacent cage elements, and end surfaces arcuately finished in conformity with the outer bearing surface.

3. In an anti-friction bearing, the combination with concentric inner and outer bearing surfaces and anti-friction members therebetween, of cage elements confining said members, each such element having the form of a closed figure with its inner and outer faces open, its sides substantially radial, and its outer margins complementary to and in contact with the outer bearing surface.

4. As a new article of manufacture, an anti-friction bearing cage element comprising a closed figure having substantially radial sides at an angle less than 180°, and having its inner and outer marginal surfaces arcuately formed concentric with the axis to which such sides are radial, the walls of said element being of increased thickness at their outer margins, whereby to provide increased bearing surface, said walls being of sufficient height to contact the bearing surface engaged by an anti-friction bearing held in said cage.

5. In an anti-friction bearing, the combination with inner and outer bearing surfaces and anti-friction members therebetween, of cage elements for said members arranged in annular series between said surfaces to an even number in excess of two, each such cage element engaging a plurality of anti-friction members to fix the relative positions thereof and being in exterior bearing contact with the exterior bearing surface throughout a peripheral extent at least as great as the angular separation of the bearing contacts of the members engaged by said element to receive support from said exterior bearing surface independently of any other cage element and any anti-friction bearing member.

6. In an anti-friction crank bearing the combination with concentric raceways, of an annular series of anti-friction spacing members, and cages for said members having radially extending end walls and arcuate outer walls, said outer walls being of materially less than 180° in curvature and of insufficient length to permit the development of destructive variations in centrifugal force in different portions of each cage member during its revolution about the crank axis, and cooperative means independent of the anti-friction spacing members for supporting said cages against deflection from a circular path.

7. In an anti-friction crank bearing the combination with concentric raceways, of an annular series of anti-friction spacing members and cages for said members having radially extending end walls and arcuate outer walls, said outer walls being of materially less than 180° in curvature and of insufficient length to permit the development of destructive variations in centrifugal force in different portions of each cage member during its revolution about the crank axis, and a circular outer bearing for said cages adapted to hold them to a line of travel concentric with the crank bearing, said cages being in end to end abutting relation to each other in their circular line of travel.

8. As a new article of manufacture, an anti-friction bearing cage to be interposed between concentric bearing races, said cage comprising an element having approximately radial sides spaced at an angle materially less than 180 degrees to receive anti-friction means loosely therebetween, and means connecting said sides, said element being surfaced with substantially exactly the same arc as the outer of said races, whereby to receive support directly therefrom independently of said anti-friction means and without rocking thereon.

9. In an anti-friction bearing cage adapted to be interposed between concentric bearing races, the combination with an annular series of anti-friction members, of an annular series of cage elements for said members to a number in excess of two, the several cage elements having substantially radial spacer walls, and side walls extending arcuately from said spacer walls loosely about said anti-friction members, the side walls being materially less than 180 degrees in extent and each element having its outer periphery surfaced in accurate conformity with the outer race to receive support directly therefrom independently of the anti-friction members and independently of other elements.

FINN T. IRGENS.